(12) United States Patent
Teuwen et al.

(10) Patent No.: US 10,147,086 B2
(45) Date of Patent: Dec. 4, 2018

(54) DIGITAL WALLET DEVICE FOR VIRTUAL WALLET

(71) Applicant: NXP B.V., Eindhoven (NL)

(72) Inventors: Philippe Teuwen, Etterbeek (BE); Cedric Colnot, Leuven (BE)

(73) Assignee: NXP B.V., Eindhoven (NL)

( * ) Notice: Subject to any disclaimer, the term of this patent is extended or adjusted under 35 U.S.C. 154(b) by 1410 days.

(21) Appl. No.: 13/720,848

(22) Filed: Dec. 19, 2012

(65) Prior Publication Data

US 2014/0172700 A1    Jun. 19, 2014

(51) Int. Cl.
| | | |
|---|---|---|
| *G06Q 40/00* | (2012.01) | |
| *G06Q 20/36* | (2012.01) | |
| *G06Q 20/32* | (2012.01) | |
| *G06Q 20/34* | (2012.01) | |
| *G07F 7/08* | (2006.01) | |

(52) U.S. Cl.
CPC ......... *G06Q 20/367* (2013.01); *G06Q 20/327* (2013.01); *G06Q 20/3223* (2013.01); *G06Q 20/3226* (2013.01); *G06Q 20/352* (2013.01); *G06Q 20/353* (2013.01); *G06Q 20/36* (2013.01); *G07F 7/0846* (2013.01)

(58) Field of Classification Search
USPC .................. 705/5, 40, 41, 35, 64, 65, 66, 67
See application file for complete search history.

(56) References Cited

U.S. PATENT DOCUMENTS

| | | | |
|---|---|---|---|
| 8,285,329 B1 | 10/2012 | Zhu | |
| 8,942,992 B1 * | 1/2015 | Zhu | ........................... 705/14.38 |
| 2005/0147797 A1 | 11/2005 | Ramachandran | |
| 2012/0074232 A1 | 3/2012 | Spodak et al. | |
| 2012/0303425 A1 * | 11/2012 | Katzin et al. | ................ 705/14.4 |
| 2012/0310826 A1 * | 12/2012 | Chatterjee | .............. G06Q 20/36 705/41 |
| 2013/0013499 A1 * | 1/2013 | Kalgi | ..................... G06Q 20/12 705/41 |
| 2013/0091551 A1 * | 4/2013 | Rajakarunanayake et al. | .. 726/4 |
| 2013/0159154 A1 * | 6/2013 | Purves | ................... G06Q 20/35 705/35 |
| 2013/0166332 A1 * | 6/2013 | Hammad | .......................... 705/5 |
| 2013/0218765 A1 * | 8/2013 | Hammad | ............... G06Q 30/06 705/41 |
| 2013/0339232 A1 * | 12/2013 | Desai | ..................... G06Q 20/08 705/41 |

(Continued)

FOREIGN PATENT DOCUMENTS

| | | |
|---|---|---|
| EP | 1341105 A1 | 9/2003 |
| EP | 1560172 A1 | 8/2006 |

(Continued)

OTHER PUBLICATIONS

"Bluetooth Low Energy", Wikipedia, 12 pgs, retrieved from the Internet on Dec. 18, 2012: https://en.wikipedia.org/wiki/Bluetooth_low_energy.

(Continued)

*Primary Examiner* — Lalita M Hamilton

(57) ABSTRACT

A reconfigurable digital wallet device such as a smart card containing a secure element and acting as an instantiation of a subset of a virtual wallet stored in the cloud. The digital wallet device is managed and synchronized with the virtual wallet in the cloud using a mobile device such as a smartphone.

20 Claims, 6 Drawing Sheets

(56) References Cited

U.S. PATENT DOCUMENTS

2013/0346302 A1* 12/2013 Purves et al. .................. 705/40
2014/0006277 A1* 1/2014 Rao ................................ 705/41
2014/0074637 A1* 3/2014 Hammad ............... G06Q 20/12
  705/21

FOREIGN PATENT DOCUMENTS

| EP | 2284783 A1 | 2/2011 |
| EP | 2383690 A1 | 11/2011 |
| TW | 201240371 A1 | 10/2012 |
| WO | 99/52066 A1 | 10/1999 |
| WO | 01/09851 A1 | 2/2001 |
| WO | 2009039419 A1 | 3/2009 |

OTHER PUBLICATIONS

"EM Microelectronic—Marin SA", 1 pg, retrieved from the Internet on Dec. 18, 2012: http://www.emmicroelectronic.com/Products.asp?IdProduct=289 (2012).
"Izettle", 3 pgs, retrieved from the Internet on Dec. 18, 2012: https://www.izettle.com/.
"iCarte", 1 pg, retrieved from the Internet on Dec. 18, 2012: http://www.icarte.ca/features110.shtml (2012).
"Bluetooth low energy", Wikipedia, the free encyclopedia, Nov. 5, 2012, Retrieved from the internent: [https://en.wikipedia.org/w/index.php?title=Bluetooth_low_energy&oldid=521556064]viewed Jul. 7, 2014.
"European Search Report for EP13197956 dated Jan. 27, 2015".
Communication pursuant to Article 94 (3) for EP Application No. 13197956.9 dated Nov. 20, 2015.

\* cited by examiner

DIGITAL WALLET DEVICE FOR VIRTUAL WALLET

The current developments in mobile payments is leading to the dematerialization of smart cards (e.g. credit cards) into a virtual wallet which is typically made possible at an electronic transaction terminal such as the point of sale (POS) by, for example, a Near Field Communication (NFC) enabled phone. For secure and efficient use, a Secure Element (SE) is typically needed in the mobile phone to house a mobile wallet. If the mobile phone does not have a secure element, secure online connectivity to a cloud is typically required for transactions using a virtual wallet stored in a cloud. The cloud is defined to be a communications network such as, for example, the Internet. Mobile phones typically do not have ISO7816 (international standard related to electronic identification cards with contacts) connectivity so that mobile phones need to be equipped with, for example, NFC capability and additionally there needs to be NFC transaction terminal capability. NFC transaction terminal capability typically requires significant additional investment by the merchant and during the transition away from a smart card to the virtual wallet using NFC, a merchant and the card issuer will typically need to support both solutions (virtual and physical cards).

DETAILED DESCRIPTION

Figure 1A:
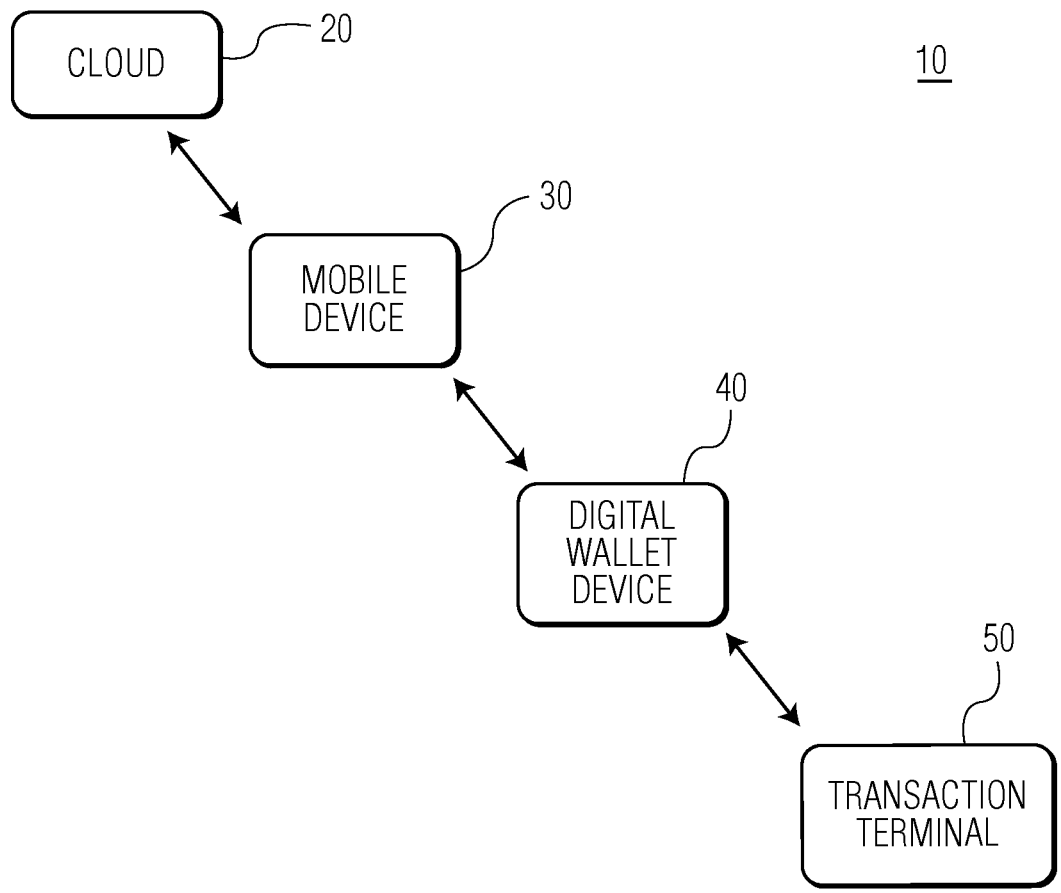
FIG. 1a shows an embodiment in accordance with the invention.

In an embodiment in accordance with the invention, the virtual wallet is "rematerialized" by using a digital wallet device, for example, a smart card in its well-known ISO7816 shape while maintaining the flexibility offered by the mobile payment scheme. This "rematerialization" is accomplished by pairing the smart card with a virtual wallet stored in a cloud using a mobile device, typically a smartphone or other mobile phone that offers connectivity to the cloud. The digital wallet device becomes an instantiation of a subset of the virtual wallet stored in the cloud. In an embodiment in accordance with the invention, this allows the smart card to be controlled by the smartphone while still allowing the smart card to be used autonomously at a transaction terminal with either ISO7816 (contact smart card) connectivity or ISO14443 (NFC connectivity) connectivity. In accordance with the invention, the smart card acts as a bridge between incompatible technologies such as, for example, ISO7816 capable points of sale and NFC phones or NFC points of sale and BLUETOOTH Low Energy enabled smart phones.

Due to the reconfigurability of the smart card, only one smart card is needed to replace a physical wallet of cards. In an embodiment in accordance with the invention, to install a new card on the smart card, a smartphone and a smart card need to communicate with each other, a secure channel needs to be established between the secure element of the smart card and the cloud using the smart phone and the new applet representing the new card that is to be installed needs to be transferred from the cloud to the secure element of the smart card. If the smartphone optionally also includes a secure element which can store the applet, the applet may be transferred from the smartphone to the smart card after mutual authentication and the establishment of a secure channel between the smartphone and the smart card.

The connectivity between a mobile phone and a smart card can be based on various technologies as long the connectivity is compliant with existing short distance wireless standards and is low power. Possibilities in accordance with the invention include Bluetooth Low Energy, NFC or a wired connection, for example, via a mobile phone's audio jack. The mobile phone may communicate with the cloud using, for example, WiFi, 3G or 4G.

A requirement for the smart card to be used autonomously at the transaction terminal is the incorporation of a secure element into the smart card. A secure element may also be incorporated into the smartphone, depending on the connectivity to the cloud and the flexibility that is desired but in accordance with the invention this is not a requirement as the smart card functions as a secure element external to the smartphone. In some embodiments in accordance with the invention, a visual indicator or display such as an e-ink, LED or OLED display may be added to the smart card and a battery or capacitor may be incorporated in the smart card to provide power. There is also the option of using an external dongle connected to, for example, the audio, USB or other powered port of a smart phone to provide power to the smart card.

FIG. 1a shows system 10 in an embodiment in accordance with the invention. System 10 includes cloud 20, wireless enabled mobile device 30, transaction terminal 50 along with digital wallet device 40 which has wireless connectivity with mobile device 30. Wireless enabled mobile device also has wireless connectivity with cloud 20. The user has wireless enabled mobile device 30 and can use their virtual wallet stored in cloud 20 at locations having transaction terminal 50 by using digital wallet device 40. Transaction terminal 50 may have contact as well as contactless connectivity with digital wallet device 40. In accordance with the invention, the user has one digital wallet device 40 typically provided by their virtual wallet provider which may be pre-personalized for immediate use and which is or can be paired with the user's virtual wallet stored in cloud 20. Pre-personalization means that the initial card configuration or applet is pre-loaded in digital wallet device 40 so the user can immediately use the card configuration or applet without first having to perform a first pairing and transfer a new card applet to digital wallet device 40. Digital wallet device 40 is configured by the user using wireless enabled mobile device 30. The configuration information is stored in secure elements 210 or 310 (e.g. see FIGS. 3a, 3b) of digital wallet device 40. For example, new cards such as bank cards, access cards or loyalty cards from the user's virtual wallet may be installed on digital wallet device 40 using wireless enabled mobile device 30 and a specific bank card may be selected for the next payment using wireless enabled mobile device 30. Installation is similar to the prior art where the virtual wallet owner can download a new applet to the secure element of a smartphone but in accordance with the invention, the download is to secure element 210 or 310 (e.g. see FIGS. 3a, 3b) of digital wallet device 40. Optionally, digital wallet device 40 may include display 115 for displaying configuration and transaction information.

Figure 1B:
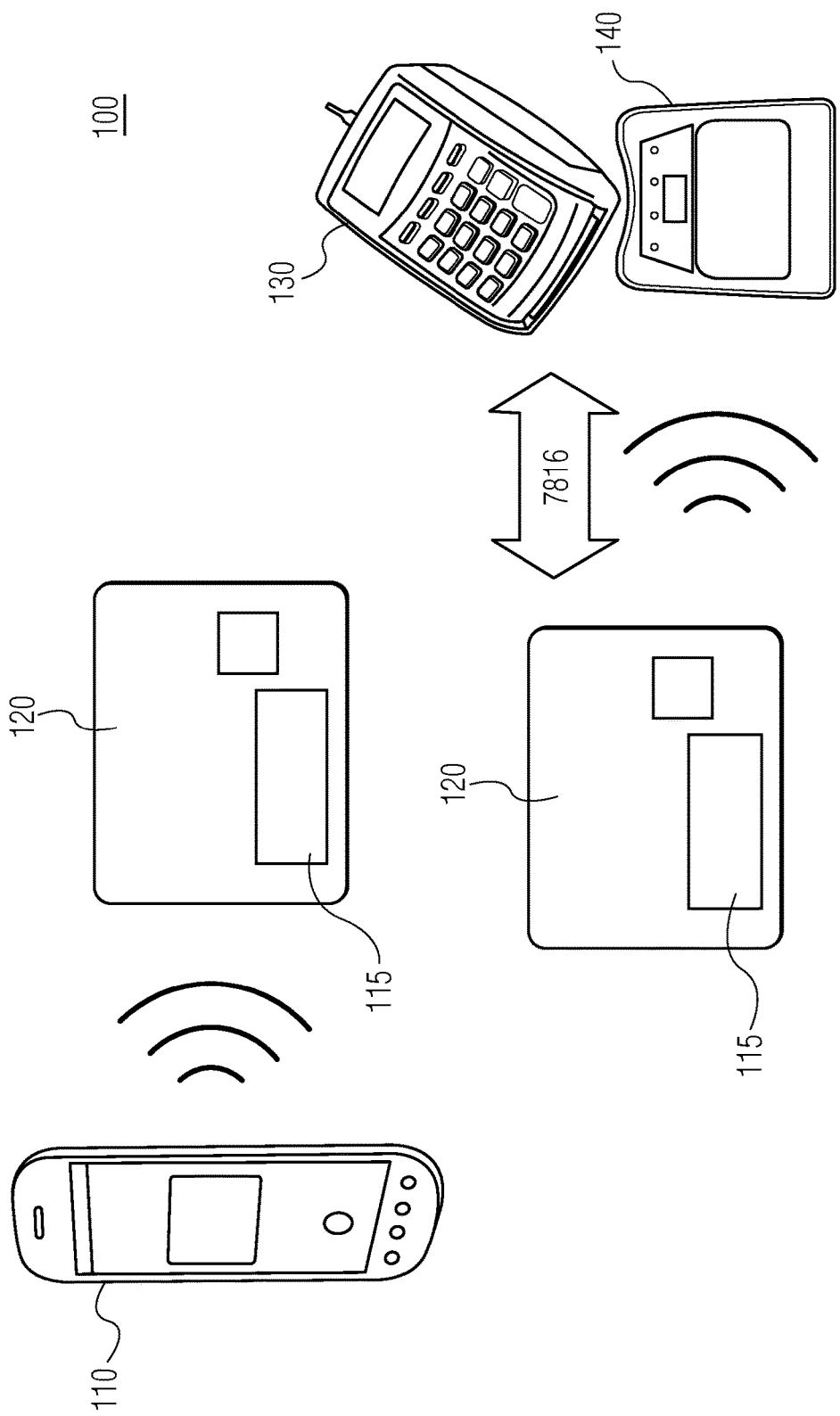
FIG. 1b shows an embodiment in accordance with the invention.

FIG. 1b shows system 100 in an embodiment in accordance with the invention. System 100 includes NFC enabled smartphone 110, contact reader 130 and NFC reader 140 along with smart card 120 which may both be part of a transaction terminal 50 (see FIG. 1a). The user has NFC enabled smartphone 110 and can use their virtual wallet at merchant locations having contact reader 130 as well as at merchant locations having NFC reader 140 by using smart card 120. In an embodiment in accordance with the invention, the user has one physical smart card 120 provided by their virtual wallet provider which may be pre-personalized so that it can be immediately used as a regular bank card and which is or can be paired with the user's virtual wallet stored in cloud 10 (see FIG. 1a). Pre-personalization means that the initial card configuration or applet is pre-loaded in physical smart card 120 so the user can immediately use the card without first having to perform a first pairing and transfer a new card applet to smart card 120. The pairing operation is described in more detail below. Smart card 120 is configured by the user with NFC enabled smartphone 110 to reflect a subset of the user's virtual wallet. The configuration information is stored in secure element 210 (see FIG. 2a) of smart card 120. For example, new cards such as bank cards or loyalty cards from the user's virtual wallet stored in cloud 20 (see FIG. 1a) may be installed on smart card 120 using NFC enabled smartphone 110 and a specific bank card may be selected for the next payment using NFC enabled smartphone 110. Installation is similar to the prior art where the virtual wallet owner can download a new applet to the secure element of a smartphone but in accordance with the invention, the download is to secure element 210 (see FIG. 2a) of smart card 120. If smart card 120 has optional display 115, for example, display 115 is an e-ink screen, smart card 120 can display the current configuration to the user. This serves to inform the user as to which card will be emulated by smart card 120 in the next transaction. Display 115 may also be used to show transaction information to the user.

Figure 1C:
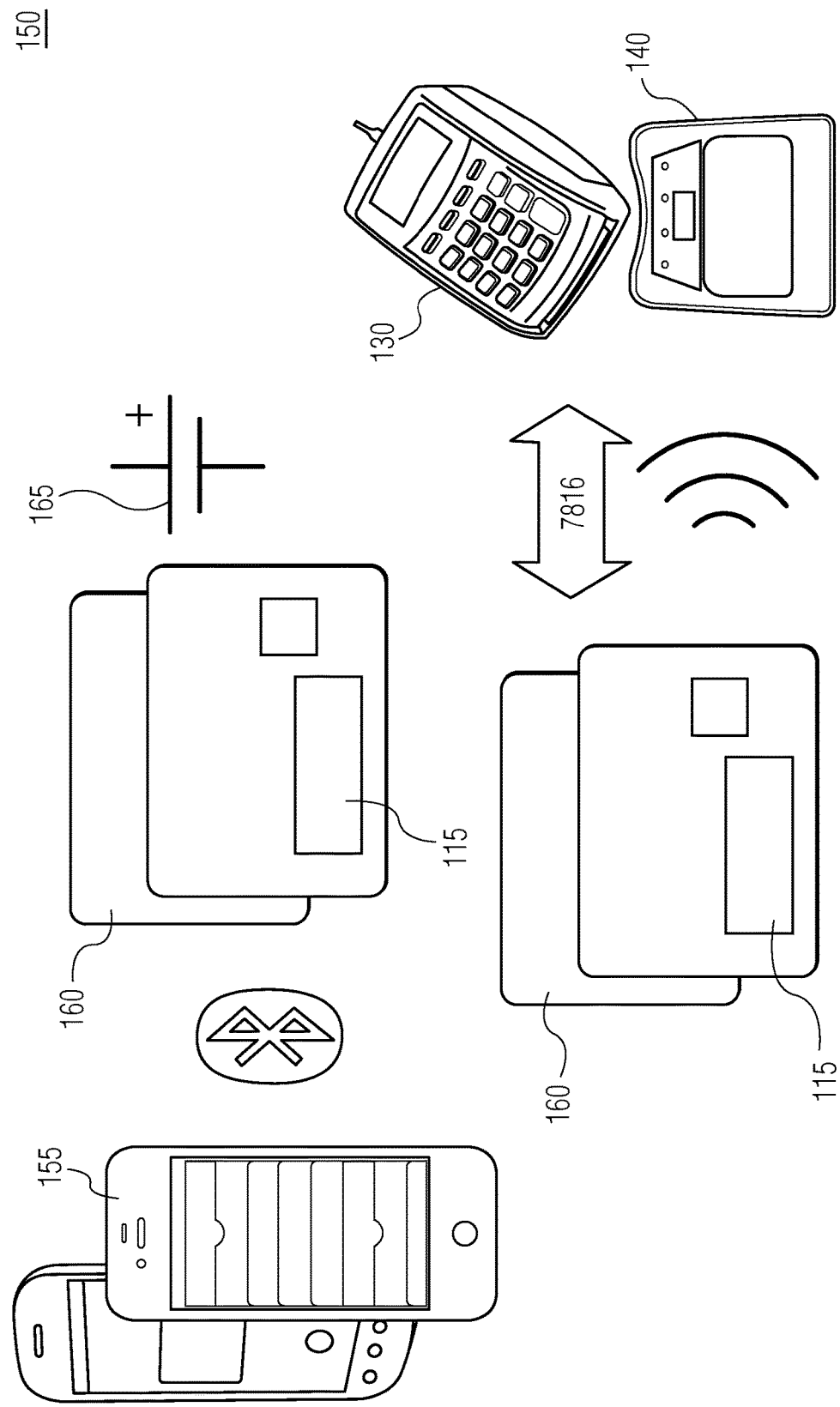
FIG. 1c shows an embodiment in accordance with the invention

FIG. 1c shows system 150 in an embodiment in accordance with the invention. System 150 includes Bluetooth Low Energy (BLE) enabled smartphone 155, contact reader 130 and NFC reader 140 which may be part of a transaction terminal 50 (see FIG. 1a) along with smart card 160. Note that smart card 160 is BLE enabled (BLE operates as a radiative field) in the embodiment and therefore smart card 160 typically requires a power source. The user has BLE enabled smartphone 155 and can use their virtual wallet stored in cloud 20 (see FIG. 1a) at merchant locations having contact reader 130 as well as at merchant locations having NFC reader 140 by using smart card 160. In accordance with the invention, the user has one physical smart card 160 typically provided by their virtual wallet provider. Smart card 160 may be pre-personalized so that it can be immediately used as a regular bank card and which is or can be paired with the user's virtual wallet stored in cloud 20 (see FIG. 1a).

If small powering device 165 provides power to smart card 160, smart card 160 may be configured by the user with BLE enabled smartphone 110 to, for example, reflect a subset of the user's virtual wallet. Powering device 165 may be a small dongle connected to smartphone 160 via the audio, USB or APPLE LIGHTENING port or powering device 165 may be or a rechargeable battery or capacitor internal to smart card 160. If powering device 165 is a small dongle connected to smartphone 155, powering device 165 either has an ISO7816 (contact) interface or an ISO14443 (NFC) interface through which to provide power to smart card 160. Power is transmitted to smart card 160 using ISO7816 contacts 220 or using NFC coil 240 (see FIG. 2b). The configuration information is stored in secure element 210 (see FIG. 2b) of smart card 160. For example, new cards such as bankcards or loyalty cards from the user's virtual wallet stored in cloud 20 (see FIG. 1a) may be installed on smart card 160 using BLE enabled smartphone 155. A specific bankcard may be selected for the next payments by the user using BLE enabled smartphone 155. For example, if smart card 160 has optional display 115 which is typically an e-ink screen that requires power to change the display content but typically retains the existing display content even without power for several weeks, smart card 160 can display the current configuration to the user. Current configuration information typically includes identification of the card applet that is currently active (e.g. customized card names like MyVISA and/or credit card numbers). This serves to inform the user as to which card will be emulated by smart card 160 in the next transaction.

Figure 2A:
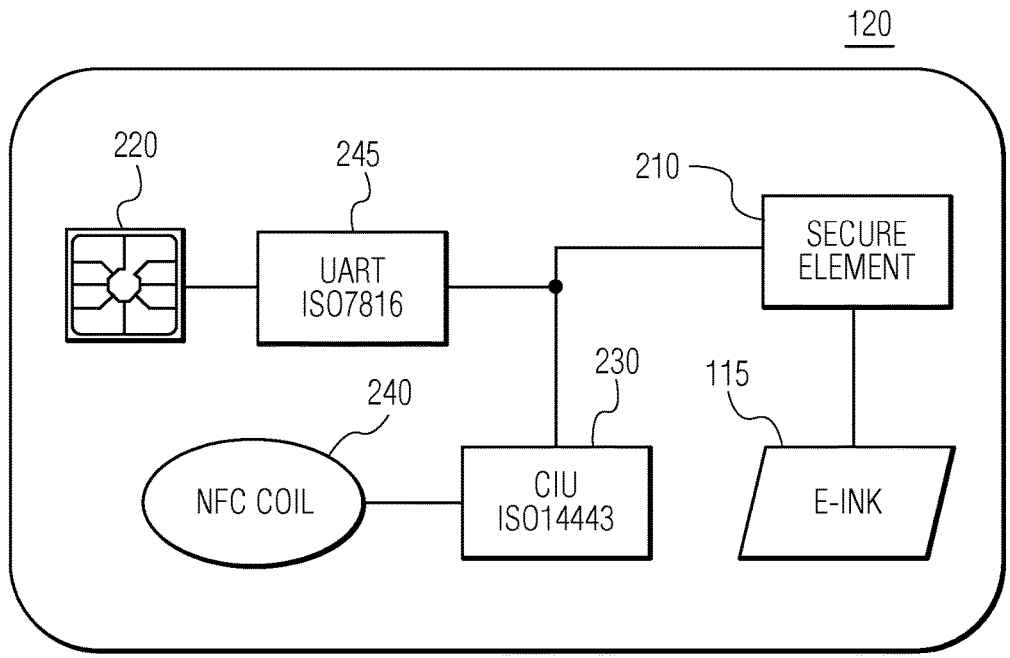
FIG. 2a shows an embodiment in accordance with the invention.

FIG. 2a shows digital wallet device 40 or smart card 120 in an embodiment in accordance with the invention. Smart card 120 includes secure element 210 connected to optional display 115, such as an e-ink display, to Contactless Interface Unit (CIU) (ISO14443) 230 and to Universal Asynchronous Receiver/Transmitter (UART) (ISO7816) 245. CIU 230 is also connected to NFC coil 240 and UART 245 is also connected to ISO7816 contacts 220.

Figure 2B:
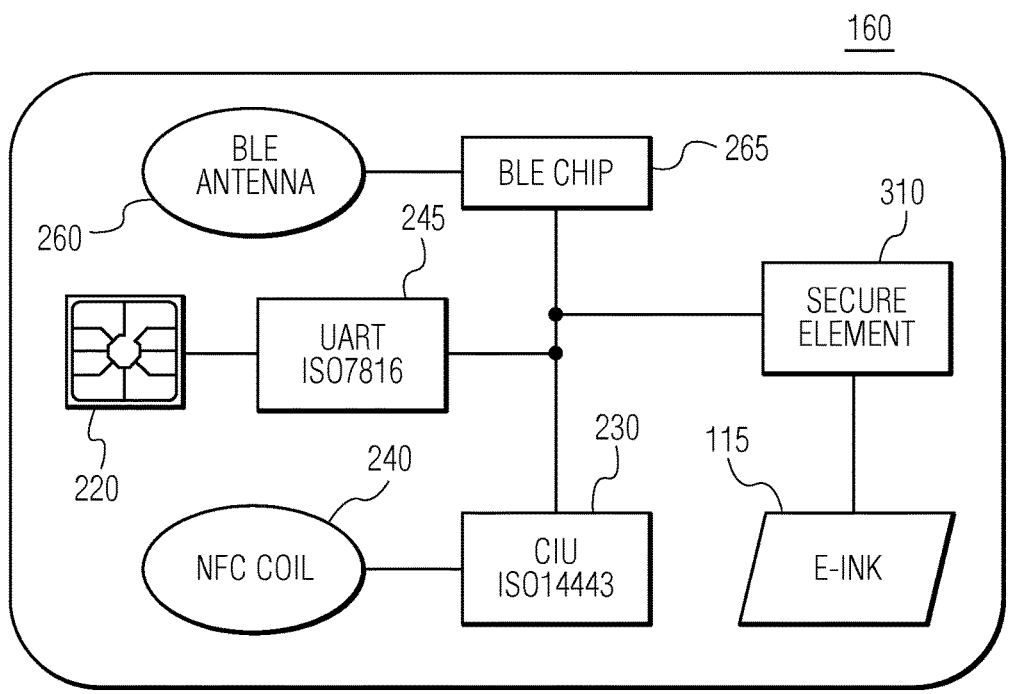
FIG. 2b shows an embodiment in accordance with the invention.

FIG. 2b shows digital wallet device 40 or smart card 160 in an embodiment in accordance with the invention. Smart card 160 includes secure element 210 connected to optional display 115, such as an e-ink display, Contactless Interface Unit (CIU) (ISO14443) 230, BLE chip 265 and Universal Asynchronous Receiver/Transmitter (UART) (ISO7816) 245. CIU 230 is also connected to NFC coil 240 and UART 245 is also connected to ISO7816 contacts 220. BLE chip 265 is also connected to BLE antenna 260.

Figure 3A:
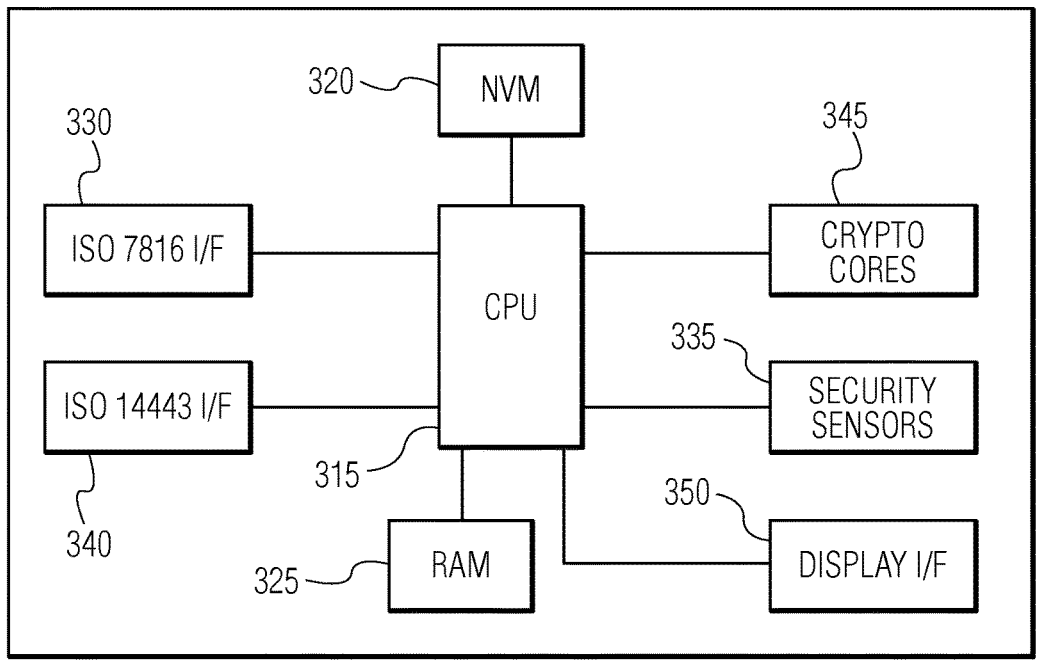
FIG. 3a shows a secure element in accordance with the invention.

FIG. 3a shows a typical embodiment in accordance with the invention for secure element 210 of digital wallet device 40 or smart card 120 in accordance with the invention. Secure element 210 includes CPU 315 connected to nonvolatile memory 320, cryptographic cores 345, security sensors 335, random access memory 325, optional display interface 350, ISO7816 contact interface 330 and ISO14443 contactless (NFC) interface 340. A flexible operating system, typically JAVA Card OS or an application running on CPU 315 allows for a number of operations to be performed between smartphone 110 and smart card 120. Programs or data may be uploaded or removed from smart card 120 so that smart card 120 may operate as, for example, a bankcard, a loyalty card, an access control card or a transit card. One card or a subset of cards may be selected to be active on smart card 120. Optional display interface 350 allows the user to see what configuration is currently active on smart card 120.

Figure 3B:
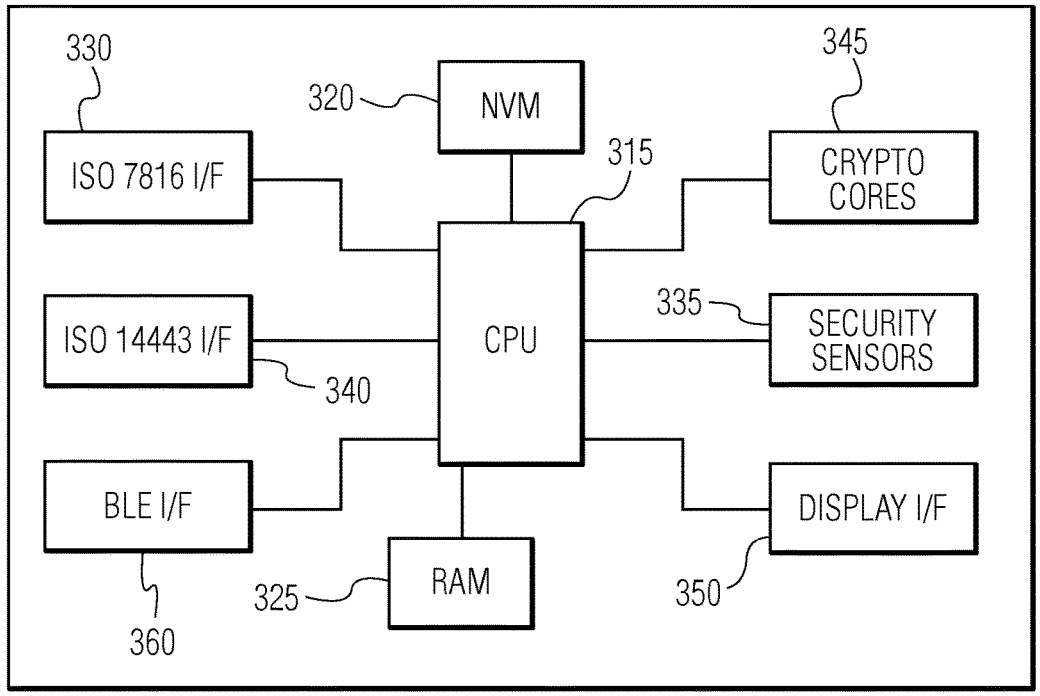
FIG. 3b shows a secure element in accordance with the invention.

FIG. 3b shows a typical embodiment in accordance with the invention for secure element 310 of digital wallet device 40 or smart card 160 which is enabled for BLUETOOTH Low Energy (BLE) in accordance with the invention. Secure element 310 includes CPU 315 connected to nonvolatile memory 320, cryptographic cores 345, security sensors 335, random access memory 325, optional display interface 350, BLE interface 360, ISO7816 contact interface 330 and ISO14443 contactless (NFC) interface 340. A flexible operating system or application running on CPU 315 allows for a number of operations to be performed between smartphone 155 and smart card 160. Programs or data may be uploaded or removed from smart card 160 so that smart card 160 may operate as a bankcard, a loyalty card or a transit card, for example. One card or a subset of cards may be selected to be active on smart card 160. Optional display interface 350 allows the user to see what configuration is currently active on smart card 160.

Figure 4:
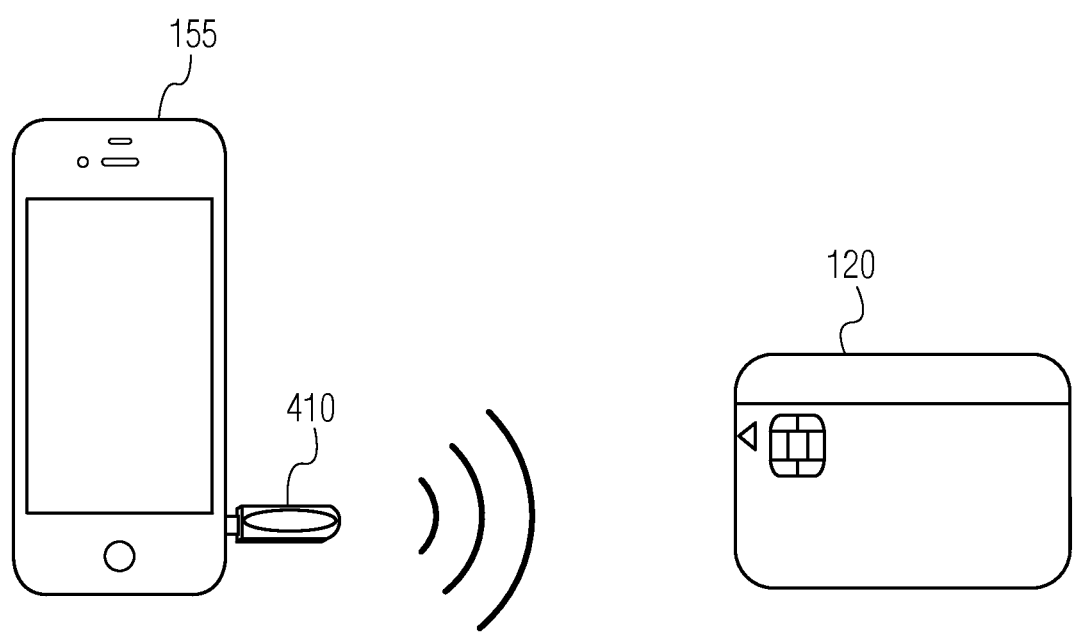
FIG. 4 shows an embodiment in accordance with the invention.

In the event that the smart card and the smartphone do not share a suitable wireless communication channel, for example, where smartphone 155 has BLE connectivity and smart card 120 has NFC connectivity, an accessory device such as NFC dongle 410 may be attached to smartphone 155 in accordance with the invention to communicate with smart card 120 as shown in FIG. 4. In this example, smart card 120 has an NFC channel and ISO7816 contact connectivity so the accessory device in the form of dongle 410 provides NFC connectivity as shown (similar to ICARTE which can convert some smart phones into NFC phones) or ISO7816 contact connectivity may be provided from smartphone 155 using a dongle similar to IZETTLE which is a plug-in contact smart card reader available for a variety of smartphones. The accessory device such as dongle 410 is typically physically connected to smartphone 155 via an audio port (with audio modem), USB port or APPLE LIGHTENING port. Other types of ports may also be used. If the chosen connectivity cannot provide power to smart card 160, for example, if smart card 160 is only BLE or WiFi enabled, then power needs to be supplied to smart card 160 using the methods described above. If the transaction terminal 130, 140 only supports NFC, ISO7816 connectivity is not required in smart card 120 which means the smart card form factor is not required and smart card 120 and the accessory device could be combined into a single object in accordance with the invention.

For pairing smart card 120 or 160 with the user's virtual wallet stored in cloud 20 (see FIG. 1a), a secure scheme must be designed to bootstrap the security. As noted above, a physical smart card such as smart card 120 or 160 may be pre-personalized by the virtual wallet provider in accordance with the invention. A shared secret may be set up between the virtual wallet and the physical smart card and/or the smart card authenticates the user's virtual wallet and the user's virtual wallet authenticates the physical smart card. Note that the pre-personalization scheme does not require a secure communication channel if the pre-personalization is performed in a secure environment (protected from man in the middle attacks and eavesdropping etc.). Pre-personalization may be performed by authorized retailers.

Another option is using branded smart cards 120 or 160 that are linked to the issuer. In this case, smart card 120 or 160 is not yet linked to the user's virtual wallet stored in cloud 20 (see FIG. 1a) but is able to authenticate the issuer during the pairing operation in the field. Branded smart cards 120 or 160 could be sold in stores and the user would then pair smart card 120 or 160 with the user's virtual wallet stored in cloud 20 (see FIG. 1a). Such pairing needs to be performed in a secure way to prevent eavesdropping and man in the middle attacks. An originality check can be added to smart card 120 or 160 so that the branded smart card issuer can verify that smart card 120 or 160 is genuine and not counterfeit.

For example, a user may buy smart card 120 or 160 and use smartphone 110 or 155, respectively, to pair smart card 120 or 160 with their virtual wallet stored in cloud 20 (see FIG. 1a). Smart card 120 or 160 and the virtual wallet stored in cloud 20 (see FIG. 1a) recognize each other as authentic and create a secure channel. Subsequently, the smart card public key is registered with the user's virtual wallet stored in cloud 20 (see FIG. 1a) or a secret is sent from the virtual wallet stored in cloud 20 (see FIG. 1a) to smart card 120 or 160 using the user's smartphone 110 or 155. The pairing process may be facilitated if a preconfigured key such as a serial number is written on smart card 120 or 160 and entered by the user into smartphone 110 or 155 or scanned if a quick response code is used and there is a scanning capability. Note that if BLE is used as for smartphone 155, a specific BLUETOOTH Smart pairing needs to occur between smartphone 155 and smartcard 160 (see FIG. 1b).

Typically, in accordance with the invention, the virtual wallet is stored in the cloud 20 (see FIG. 1a) but in the event that a smartphone includes a secure element, a mobile wallet can be configured in the smartphones's secure element. In that case the pairing operation occurs between the smart card and a mobile wallet that is configured in the secure element of the smartphone.

Once smart card 120 or 160 and the virtual wallet stored in cloud 20 (see FIG. 1a) (or mobile wallet if the smartphone is secure element equipped, for example) are paired, an authenticated and encrypted communication channel can be readily set up by smart card 120 or 160 and the virtual wallet.

In order to allow for the smart card reconfiguration described above, smart card 120 or 160 must support a number of operations such as uploading and removing programs or data so that smart card 120 and 160 may operate as a variety of cards such as a bankcard, a loyalty card, access card or a transit card, for example. Additionally, it needs to be possible to deselect or select one or more of the cards that are to be activated in smartcard 120 or 160; set or change the priorities among the cards contained in smartcard 120 or 160; and set or change the information displayed on optional display 115 for smart card 120 or 160. Smart card 120 or 160 may also support additional operations such as maintaining transaction logs during use with the transaction terminal and these logs may be later cleared by the virtual wallet stored in cloud 20 (see FIG. 1a) or smart phone 110 or 155.

Prior art methods that use smartphones with secure elements to do eBanking or eCommerce can be extended for use in accordance with the invention by allowing a mobile device or smartphone without a secure element to perform the same functions when used together with a digital wallet device or smart card. Because communication between smartphone 120 or 160 and secure element 210 or 310, respectively, is now outside of smartphone 120 or 160, mutual authentication and encrypted communications are required as noted above.

The invention claimed is:

1. A digital wallet device comprising:
   a wireless communications unit;
   a secure element including a cryptographic core, electrically coupled to the wireless communications unit, the secure element configured to communicate with an external mobile device via the wireless communications unit and securely pair with the external mobile device such that the secure element is able to store and synchronize a subset of a virtual wallet stored in a cloud using the external mobile device that is configured to communicate with the cloud;
   wherein the secure element is configured to communicate with a transaction terminal to perform a transaction.

2. The digital wallet device of claim 1 where the subset of the virtual wallet storable in the secure element is configurable using the mobile device.

3. The digital wallet of device of claim 1 where the secure element is electrically coupled to a second wireless communications unit, the secure element further configured to communicate with a transaction terminal via the second wireless communications unit.

4. The digital wallet of claim 3 where the second wireless communications unit is configured to communicate with the transaction terminal using NFC connectivity.

5. The digital wallet of claim 3 where the transaction terminal comprises an NFC reader.

6. The digital wallet device of claim 1 where the wireless communications unit comprises a control interface unit and a Near Field Communications (NFC) coil.

7. The digital wallet device of claim 1 where the secure element is configured to operate autonomously from the mobile device at a transaction terminal.

8. The digital wallet device of claim 7 where the device has both contact connectivity and NFC connectivity for connecting to the transaction terminal.

9. The digital wallet device of claim 1 where the wireless communications unit comprises a BLUETOOTH Low Energy (BLE) integrated circuit and a BLE antenna.

10. The digital wallet device of claim 9 where the secure element is powerable by a transaction terminal.

11. The digital wallet device of claim 10 where the transaction terminal comprises a contact reader.

12. The digital wallet device of claim 9 where the secure element is powerable by an external dongle attached to a port of the mobile device.

13. The digital wallet device of claim 12 where the port is selected from the group consisting of: an audio port, a USB port and an APPLE LIGHTENING port.

14. The digital wallet device of claim 9 where the device is configured to be powered by an internal battery.

15. The digital wallet device of claim 1 where the mobile device is a smartphone.

16. The digital wallet device of claim 1 where the device is a smart card.

17. The digital wallet device of claim 1 where the device comprises a display.

18. The digital wallet device of claim 17 where the display is an e-ink display.

19. The digital wallet device of claim 17 where the display is configured to show configuration information of the smart card.

20. A system comprising a digital wallet device comprising:
   a wireless communications unit;
   a secure element including a cryptographic core, electrically coupled to the wireless communications unit, the secure element configured to communicate with an external mobile device via the wireless communications unit and securely pair with the external mobile device such that the secure element is able to store and synchronize a subset of a virtual wallet stored in a cloud using the external mobile device that is configured to communicate with the cloud, wherein the secure element is configured to communicate with a transaction terminal to perform a transaction;
   and a virtual card selected from the group consisting of a bankcard, a loyalty card and a transit card where the virtual card is part of the subset of the virtual wallet stored in the cloud and the virtual card is configured to be stored in the secure element of the digital wallet device.

* * * * *